US011442498B2

(12) United States Patent
Jangili Ganga et al.

(10) Patent No.: US 11,442,498 B2
(45) Date of Patent: Sep. 13, 2022

(54) UNIVERSAL BRACKET FOR MULTIPLE FORM FACTORS OF PCIE CARDS IN OCP SLED ENVIRONMENTS

(71) Applicant: Smart Embedded Computing, Inc., Tempe, AZ (US)

(72) Inventors: Siva Prasad Jangili Ganga, Nizampet Village (IN); Christopher M. Madsen, Mesa, AZ (US)

(73) Assignee: SMART EMBEDDED COMPUTING, INC., Tempe, AZ (US)

( * ) Notice: Subject to any disclaimer, the term of this patent is extended or adjusted under 35 U.S.C. 154(b) by 9 days.

(21) Appl. No.: 16/529,919

(22) Filed: Aug. 2, 2019

(65) Prior Publication Data
US 2021/0034097 A1 Feb. 4, 2021

(51) Int. Cl.
G06F 1/16 (2006.01)
H01R 13/627 (2006.01)
G06F 13/42 (2006.01)
H01R 12/72 (2011.01)

(52) U.S. Cl.
CPC ............ *G06F 1/16* (2013.01); *G06F 13/4221* (2013.01); *G06F 13/4282* (2013.01); *H01R 12/722* (2013.01); *H01R 13/6275* (2013.01)

(58) Field of Classification Search
None
See application file for complete search history.

(56) References Cited

U.S. PATENT DOCUMENTS

| 7,523,901 | B2 * | 4/2009 | Wu ....................... | G11B 33/128 248/27.3 |
| 7,576,979 | B1 * | 8/2009 | Dearborn ............. | H05K 7/1489 600/219 |
| 7,576,984 | B2 * | 8/2009 | Chen .................... | G11B 33/124 361/679.33 |
| 7,679,896 | B2 * | 3/2010 | Deng ..................... | G06F 1/187 361/679.33 |
| 7,969,729 | B2 * | 6/2011 | Yang .................... | H05K 7/1489 360/99.2 |
| 8,405,966 | B2 * | 3/2013 | Hartman ................ | G06F 1/186 361/679.31 |
| 10,546,616 | B2 * | 1/2020 | Ku ....................... | G11B 33/124 |
| 2004/0084388 | A1 * | 5/2004 | Roesner ................ | G06F 1/186 211/41.17 |
| 2008/0310095 | A1 * | 12/2008 | Chiang ................ | H05K 7/023 361/725 |
| 2009/0046437 | A1 * | 2/2009 | Hsieh ................... | H05K 7/1431 361/752 |

(Continued)

*Primary Examiner* — Anthony Q Edwards
*Assistant Examiner* — Rashen E Morrison
(74) *Attorney, Agent, or Firm* — Withrow & Terranova, P.L.L.C.

(57) ABSTRACT

A universal bracket includes a first wall, a second wall, and a third wall. The first wall is configured to be fixed to a first circuit card and a second circuit card. The first circuit card and the second circuit card include any of at least two different standardized types of circuit cards. The second wall is opposite the first wall. The third wall extends between the first wall and the second wall and is configured to be fixed to a riser card having a first connector for receiving a first mating connector of the first circuit card and a second connector for receiving a second mating connector of the second circuit card.

20 Claims, 8 Drawing Sheets

(56) References Cited

U.S. PATENT DOCUMENTS

| | | | | |
|---|---|---|---|---|
| 2009/0059506 A1* | 3/2009 | Yeh | ................ | G11B 33/08 |
| | | | | 361/679.34 |
| 2009/0296338 A1* | 12/2009 | Peng | ................ | G11B 33/121 |
| | | | | 248/231.9 |
| 2010/0009573 A1* | 1/2010 | Ting | ................ | G06K 7/0034 |
| | | | | 439/630 |
| 2010/0039766 A1* | 2/2010 | Chiang | ................ | G11B 33/08 |
| | | | | 267/141 |
| 2010/0101285 A1* | 4/2010 | Hsu | ................ | G06F 1/183 |
| | | | | 70/58 |
| 2010/0165564 A1* | 7/2010 | Lu | ................ | G06F 1/187 |
| | | | | 361/679.35 |
| 2012/0134091 A1* | 5/2012 | Zhang | ................ | G06F 1/185 |
| | | | | 361/679.32 |
| 2013/0100619 A1* | 4/2013 | Fan | ................ | H05K 7/1487 |
| | | | | 361/752 |
| 2013/0107441 A1* | 5/2013 | Zhou | ................ | G06F 1/185 |
| | | | | 361/679.32 |
| 2014/0209766 A1* | 7/2014 | Chang | ................ | G06F 1/185 |
| | | | | 248/201 |
| 2015/0115120 A1* | 4/2015 | Yu | ................ | H05K 7/1487 |
| | | | | 248/288.11 |
| 2019/0027850 A1* | 1/2019 | Jau | ................ | H01R 12/675 |
| 2019/0302858 A1* | 10/2019 | Ali | ................ | G06F 1/186 |
| 2020/0045843 A1* | 2/2020 | Schramm | ................ | G06F 1/186 |
| 2020/0310501 A1* | 10/2020 | Tsorng | ................ | G06F 1/187 |
| 2020/0393878 A1* | 12/2020 | Tiritilli | ................ | G06F 1/186 |

* cited by examiner

US 11,442,498 B2

UNIVERSAL BRACKET FOR MULTIPLE FORM FACTORS OF PCIE CARDS IN OCP SLED ENVIRONMENTS

FIELD

The present disclosure relates to universal bracket systems for multiple form factors of PCIe cards in OCP sled environments.

BACKGROUND

This section provides background information related to the present disclosure which is not necessarily prior art.

Computer systems may include multiple Peripheral Component Interconnect Express (PCIe) cards, such as for processing capability or graphics performance capability. PCIe cards are available in a variety of form factors. For example, PCIe cards are available in both low-profile and standard-profile widths. PCIe cards also come in various lengths, such as half-length, three-quarter-length, and full-length. A PCIe card is connected to a riser card, which is connected to a motherboard in a sled environment. The different sizes of PCIe cards require different mounting systems, such as a variety of different brackets based on the form factor. PCIe front panels may need to be removed for use in the bracket system.

SUMMARY

This section provides a general summary of the disclosure, and is not a comprehensive disclosure of its full scope or all of its features.

A universal bracket includes a first wall, a second wall, and a third wall. The first wall is configured to be fixed to a first circuit card and a second circuit card. The first circuit card and the second circuit card include any of at least two different standardized types of circuit cards. The second wall is opposite the first wall. The third wall extends between the first wall and the second wall and is configured to be fixed to a riser card having a first connector for receiving a first mating connector of the first circuit card and a second connector for receiving a second mating connector of the second circuit card.

A sled assembly includes a sled frame, including a peripheral wall at least partially defining an internal compartment. The sled assembly also includes a motherboard disposed within the internal compartment of the sled frame. The sled assembly also includes at least one universal bracket assembly. The universal bracket assembly includes a riser card that is physically and electrically connected to the motherboard and has a first connector and a second connector. The universal bracket assembly also includes a universal bracket, which includes a first wall, a second wall opposite the first wall, a third wall extending between the first wall and the second wall, and a support including a panel that extends between the first wall and the second wall and is disposed opposite the third wall, the riser card being fixed to the third wall. The universal bracket assembly also includes a first circuit card fixed to the first wall, which has a first mating connector physically and electrically connected to the first connector of the riser card. The universal bracket assembly also includes a second circuit card fixed to the first wall, which has a second mating connector physically and electrically connected to the second connector of the riser card, wherein the first circuit card and the second circuit card include any of at least two different standardized types of circuit cards.

A method of assembling a sled assembly for a 2U-based chassis includes fixing a riser card to a universal bracket. The universal bracket includes a first wall, a second wall opposite the first wall, and a third wall extending between the first wall and the second wall. The riser card has a first connector and a second connector. The method of assembling a sled assembly for a 2U-based chassis also includes physically and electrically connecting a first mating connector of a first circuit card to the first connector of the riser card. The first circuit card includes any of at least two different standardized types of circuit cards. The method of assembling a sled assembly for a 2U-based chassis also includes physically and electrically connecting a first mating connector of a second circuit card to the second connector of the riser card. The second circuit card includes any of the at least two different standardized types of circuit cards.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As discussed above, different form factors of PCIe cards typically require corresponding different brackets or mounting systems for assembly in a sled environment. In some cases, front panels of the PCIe cards are removed for assembly into the brackets or mounting systems. End users may be unfamiliar with the various bracket systems. Thus, the potential for incorrect assembly of the PCIe card to a bracket and ultimately into a sled environment is high. Incorrect assembly can lead to damage of the PCIe card and/or malfunction of the computer system.

In various aspects, the present disclosure provides a universal bracket that can accommodate various form factors of PCIe cards. In certain embodiments, the universal bracket can accommodate both standard-profile and low-profile PCIe cards, as well as half-length, three-quarter-length, and full-length PCIe cards. Thus, the universal bracket can accommodate six different form factors of PCIe cards: half-length low-profile, three-quarter-length low-profile, full-length low-profile, half-length standard-profile, three-quarter-length standard-profile, and full-length standard-profile. In certain embodiments, the universal bracket system may be used within an Open Compute Project (OCP) sled environment, such as a custom 2U-based chassis. The universal bracket may reduce design variety by eliminating the need to manufacture individual brackets for each PCIe configuration. As such, the universal bracket may also decrease manufacturing cost. The universal bracket system may also improve end user convenience by eliminating the confusion that can result from determining the appropriate bracket to use for a particular PCIe card. The simplified universal bracket can also reduce the possibility of damage to cards and connectors from use of an improper bracket or mounting system. Finally, the universal bracket can maximize the space and possible configurations of PCIe cards within a limited space.

Figure 1:
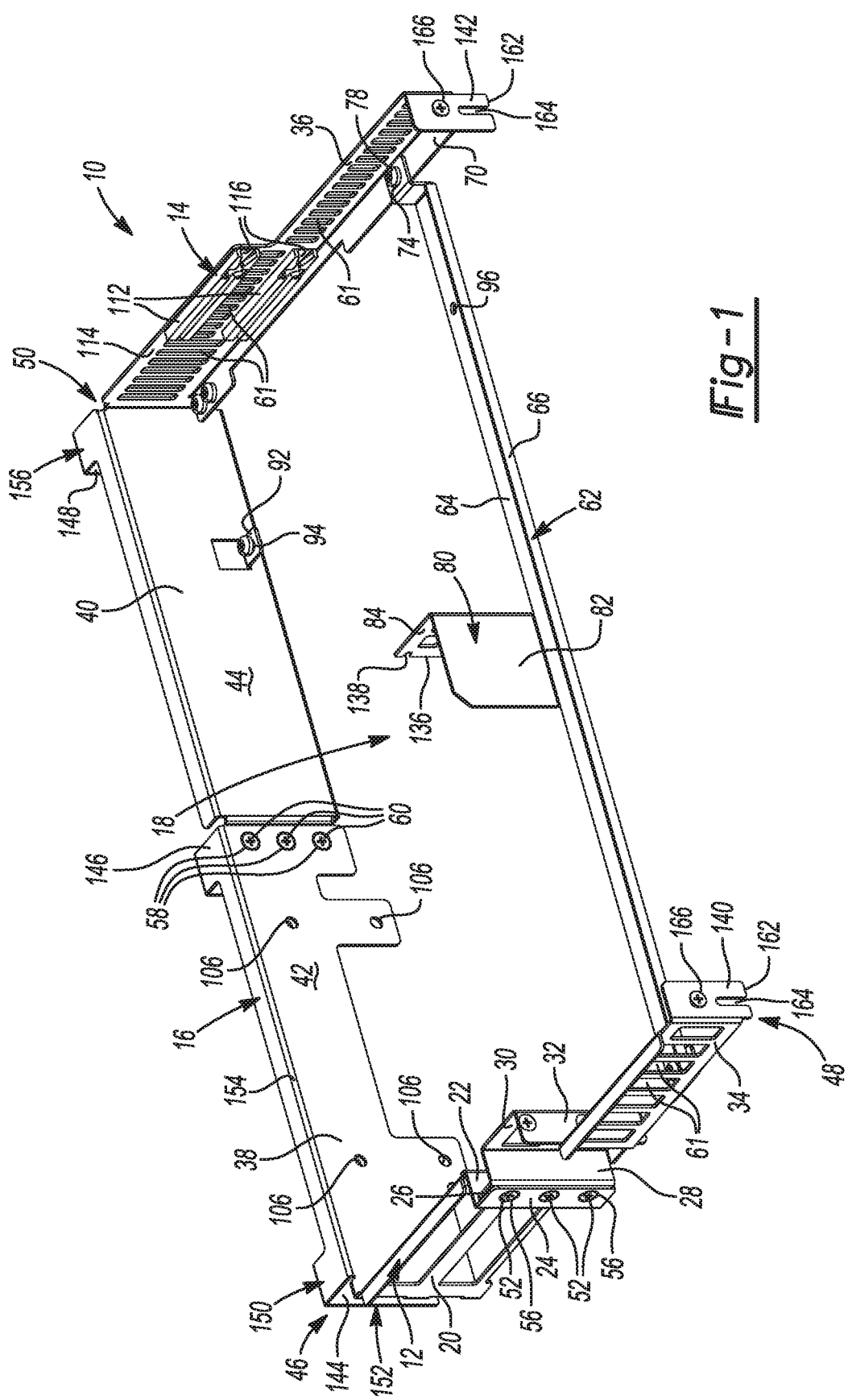
FIG. 1 is a perspective view of a universal bracket in accordance with the present disclosure.

Referring to FIG. 1, a universal bracket 10 according to certain aspects of the present disclosure is provided. The universal bracket 10 may include a first wall 12 and a second wall 14 opposite the first wall 12. A third wall 16 may extend between the first wall 12 and the second wall 14. The third wall 16 may connect the first wall 12 and the second wall 14. The first wall 12, the second wall 14, and the third wall 16 may cooperate to at least partially define an inner area 18.

Each of the walls 12, 14, 16 may include one or more panels. The panels may include features for alignment and/or fastening, as will be described in greater detail below. The first wall 12 may include a first panel 20, a second panel 22, and a third panel 24. The second panel 22 may extend between the first panel 20 and the third panel 24. The second panel 22 may extend from the first panel 20 away from the second wall 14. The second panel 22 may be substantially perpendicular to the first panel 20. The third panel 24 may extend from the second panel 22 away from the first panel 20. The third panel 24 may be substantially perpendicular to the second panel 22.

The first wall 12 may also include a fourth panel 26, a fifth panel 28, a sixth panel 30, a seventh panel 32, and an eighth panel 34. The fourth panel 26 may engage the third panel 24. More specifically, an inner surface of the third panel 24 may directly contact an outer surface of the fourth panel 26 so that the third and fourth panels 24, 26 are disposed on top of one another. Thus, the fourth panel 26 may be disposed substantially parallel to the third panel 24.

The fifth panel 28 may extend from the fourth panel 26 toward the second wall 14. The fifth panel 28 may be disposed substantially perpendicular to the fourth panel 26 and substantially parallel to the second panel 22. The sixth panel 30 may extend from the fifth panel 28 away from the fourth panel 26. The sixth panel 30 may be disposed substantially perpendicular to the fifth panel 28 and substantially parallel to the fourth panel 26. The seventh panel 32 may extend from the sixth panel 30 away from the second wall 14. The seventh panel 32 may be disposed substantially perpendicular to the sixth panel 30 and substantially parallel to the fifth panel 28. The eighth panel 34 may extend from the seventh panel 32 away from the fourth panel 26. The eighth panel 34 may be disposed substantially perpendicular to the seventh panel 32 and substantially parallel to the sixth panel 30.

The second wall 14 may include a ninth panel 36. The ninth panel 36 may be disposed substantially parallel to the first panel 20, the third panel 24, the fourth panel 26, the sixth panel 30, and the eighth panel 34 of the first wall 12. The third wall 16 may include a tenth panel 38, an eleventh panel (not shown), and a twelfth panel 40. The tenth panel 38 may extend from the first panel 20 of the first wall 12. The tenth panel 38 may be disposed substantially perpendicular to the first panel 20. The twelfth panel 40 may extend from the ninth panel 36 of the second wall 14. The twelfth panel 40 may be disposed substantially perpendicular to the ninth panel 36. The eleventh panel may be disposed between the tenth panel 38 and the twelfth panel 40. The eleventh panel may at least partially overlap the tenth panel 38. The tenth panel 38, the eleventh panel, and the twelfth panel 40 may all be disposed substantially parallel to one another. The tenth panel 38 may have an inside surface 42 disposed toward the inner area 18. The twelfth panel 40 may have an inside surface 44 disposed toward the inner area 18. The inside surfaces 42, 44 may be coplanar.

The first, second, and third walls 12, 14, 16 of the universal bracket 10 may include one or more components. For example, as shown in FIG. 1, a first component 46 may include the first, second, and third panels 20, 22, 24 of the first wall 12 and the tenth panel 38 of the third wall 16. Thus, the first, second, third, and tenth panels 20, 22, 24, 38 may be integrally formed. A second component 48 may include the fourth, fifth, sixth, seventh, and eighth panels 26, 28, 30, 32, 34 of the first wall 12. Thus, the fourth, fifth, sixth, seventh, and eighth panels 26, 28, 30, 32, 34 may be integrally formed. A third component 50 may include the ninth panel 36 of the second wall 14, and the eleventh panel and the twelfth panel 40 of the third wall 16. Thus, the ninth panel 36, the eleventh panel, and the twelfth panel 40 may be integrally formed.

The first component 46 may be fixed to the second component 48 along the first wall 12. More specifically, the third panel 24 may be fixed to the fourth panel 26. The third panel 24 may include a plurality of first apertures 52 and the fourth panel 26 may include a plurality of second apertures (not shown). The plurality of first apertures 52 may be aligned with the plurality of second apertures. A plurality of first fasteners 56 may extend through the plurality of first apertures 52 and the plurality of second apertures to engage the third panel 24 with the fourth panel 26 and to fix the first component 46 to the second component 48.

The first component 46 may be fixed to the third component 50 along the third wall 16. More specifically, the eleventh panel (not shown) may be fixed to the tenth panel 38. The tenth panel 38 may include a plurality of third apertures 58 and the eleventh panel may include a plurality of fourth apertures (not shown). The plurality of third apertures 58 may be aligned with the plurality of fourth apertures. A plurality of second fasteners 60 may extend through the plurality of third apertures 58 and the plurality of fourth apertures to engage the tenth panel 38 with the eleventh panel and to fix the first component 46 to the third component 50. Although the first, second, and third walls 12, 14, 16 are depicted as including twelve panels among three distinct components, one skilled in the art would appreciate that other configurations are contemplated within the scope of the present disclosure. In certain aspects, one or more of the panels may include openings 61. The openings 61 may facilitate airflow and weight reduction.

The universal bracket 10 may further include a support 62. The support 62 may extend between the first wall 12 and the second wall 14. The support 62 may include a base 64 and a lip 66. The lip 66 may extend substantially parallel to the tenth panel 38. The base 64 may extend substantially perpendicular to the lip 66 and the eighth panel 34. The base 64 may be disposed inward of the lip 66 with respect to the inner area 18. The support 62 may be fixed to the eighth panel 34 of the first wall 12 and the ninth panel 36 of the second wall 14.

A first tab 68 (FIG. 2) may extend from the eighth panel 34 into the inner area 18. The first tab 68 may extend substantially perpendicular to the eighth panel 34 and substantially parallel to the base 64. The first tab 68 may define a fifth aperture (not shown). A second tab 70 may extend from the ninth panel 36 into the inner area 18. The second tab 70 may extend substantially perpendicular to the ninth panel 36 and substantially parallel to the base 64. The second tab 70 may define a sixth aperture (not shown). The base 64 may define a seventh aperture 72 (FIG. 2) and an eighth aperture 74. A third fastener 76 (FIG. 2) may extend through the fifth aperture and the seventh aperture 72 to fix the support 62 to the first wall 12. A fourth fastener 78 may extend through the sixth aperture and the eighth aperture 74 to fix the support 62 to the second wall 14.

An internal wall 80 may be fixed to the support 62. The internal wall 80 may be disposed between the first wall 12 and the second wall 14. The internal wall 80 may include a thirteenth panel 82 and a fourteenth panel 84. The thirteenth panel 82 may be fixed to the base 64. The thirteenth panel 82 may extend substantially parallel to the lip 66. The fourteenth panel 84 may extend from the thirteenth panel 82 into the inner area 18. The fourteenth panel 84 may extend substantially perpendicular to the thirteenth panel 82 and the base 64. In some embodiments, the internal wall 80 may be integrally formed with the support 62. In other embodiments, the internal wall 80 may be fixed to the support 62, for example, by welding.

Figure 2:
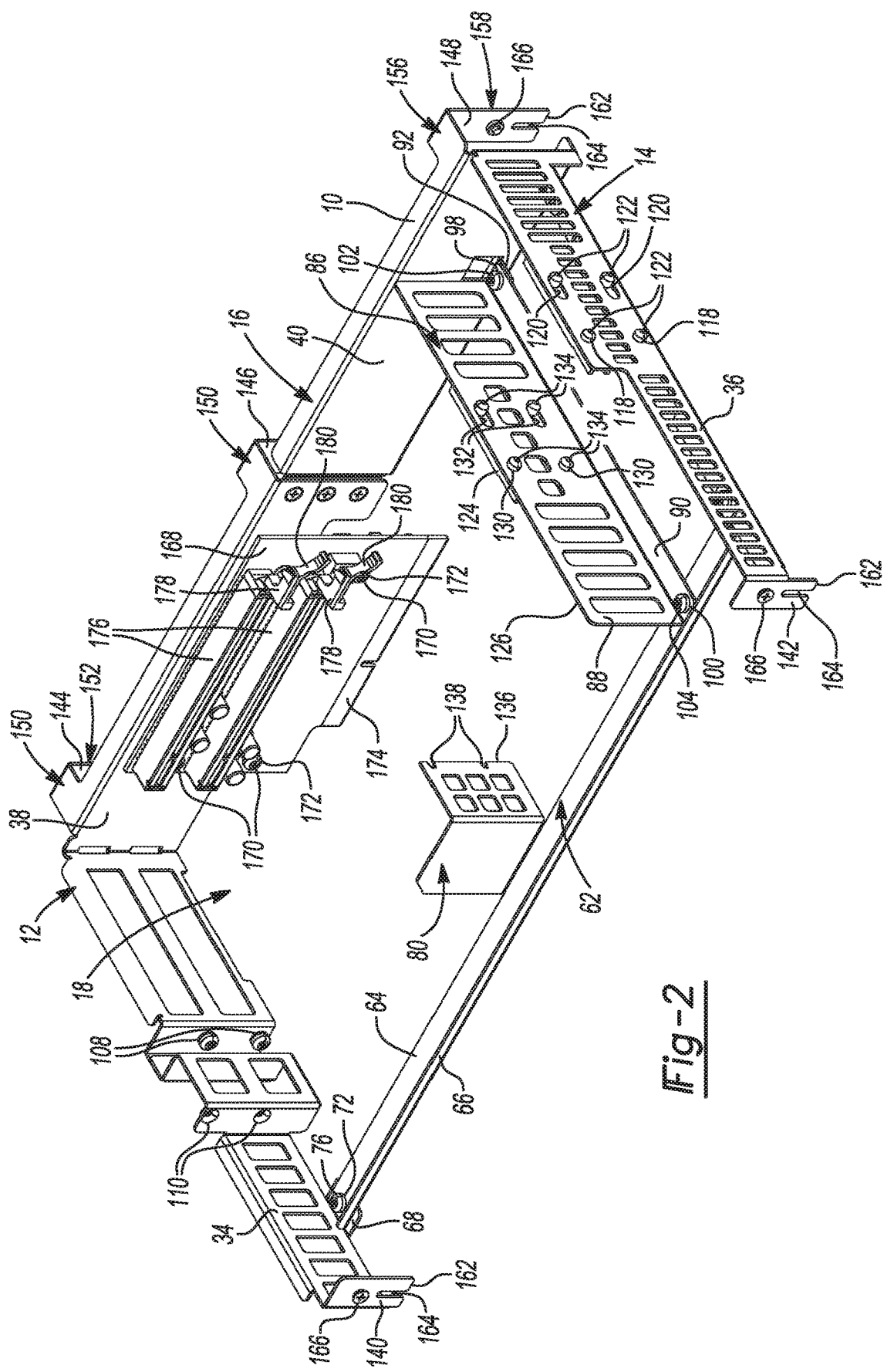
FIG. 2 is another perspective view of the universal bracket of FIG. 1, including a riser card.

As shown in FIG. 2, the universal bracket 10 may further include a removable fourth wall 86. The fourth wall 86 may be disposed between the first wall 12 and the second wall 14. More specifically, the fourth wall 86 may be disposed between the internal wall 80 and the second wall 14. The removable fourth wall 86 may be used to support certain PCIe cards (e.g., three-quarter-length PCIe cards). The removable fourth wall 86 may be disassembled from the bracket when it is not needed. (e.g., when only half-length or full-length PCIe cards are assembled to the universal bracket 10). The fourth wall 86 may extend between the third wall 16 and the support 62. The fourth wall 86 may include a fifteenth panel 88 that extends substantially parallel to the ninth panel 36 of the second wall 14. The fourth wall 86 may also include a lip 90 extending from the fifteenth panel 88 toward the ninth panel 36 and substantially perpendicular to the fifteenth panel 88.

The fourth wall 86 may be fixed to the twelfth panel 40 of the third wall 16 and the base 64 of the support 62. A third tab 92 may extend from the twelfth panel 40 into the inner area 18. The third tab 92 may define a ninth aperture 94. The base 64 may define a tenth aperture 96 (FIG. 1) disposed between the seventh aperture 72 and the eighth aperture 74. The lip 90 of the fourth wall 86 may include an eleventh aperture 98 and a twelfth aperture 100. A fifth fastener 102 may extend through the ninth aperture 94 and the eleventh aperture 98 to fix the fourth wall 86 to the third wall 16. A sixth fastener 104 may extend through the tenth aperture 96 and the twelfth aperture 100 to fix the fourth wall 86 to the support 62.

Returning to FIG. 1, the universal bracket 10 may include various mounting features for attaching PCIe cards to the universal bracket 10. The tenth panel 38 may include a plurality of thirteenth apertures 106 for fixing a riser card (e.g., riser card 168 of FIG. 2) to the third wall 16. The second panel 22 may include a plurality of fourteenth apertures 108 (FIG. 2) for fixing a low-profile PCIe card (e.g. half-length low-profile PCIe card 190 of FIG. 3, three-quarter-length low-profile PCIe card 206 of FIG. 4, full-length low-profile PCIe card 224 of FIG. 5) to the first wall 12. The seventh panel 32 may include a plurality of fifteenth apertures 110 (FIG. 2) for fixing a standard-profile PCIe card (e.g. half-length standard-profile PCIe card 242 of FIG. 6, three-quarter-length standard-profile PCIe card 260 of FIG. 7, full-length standard-profile PCIe card 280 of FIG. 8) to the first wall 12.

Two first support blocks 112 may be fixed to an inside surface 114 of the ninth panel 36 of the second wall 14. Each first support block 112 may define a first channel 116. The ninth panel 36 may include a pair of first receptacles 118 and a pair of first slots 120 (FIG. 2). Each first support block 112 may include two first pins 122. Each first support block 112 may be fixed to the ninth panel 36 by engagement of the first pins 122 in respective first receptacles 118 and first slots 120. The first channels 116 may receive edges of full length PCIe cards (e.g., full-length low-profile PCIe card 224 of FIG. 5, full-length standard-profile PCIe card 280 of FIG. 8).

Figure 4:
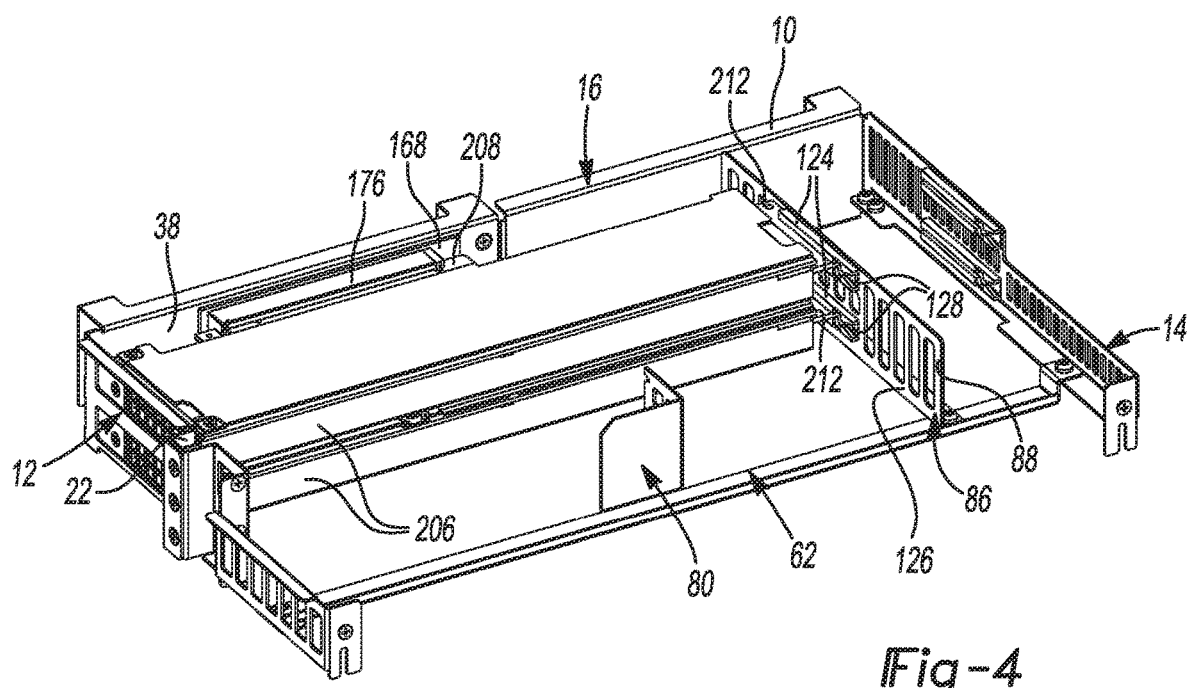
FIG. 4 is a perspective view of the universal bracket of FIG. 1 fixed to two three-quarter-length low-profile PCIe cards.

Returning to FIG. 2, two second support blocks 124 may be fixed to an inside surface 126 of the fifteenth panel 88 of the fourth wall 86 (FIG. 4). Each second support block 124 may define a second channel 128 (FIG. 4). The fifteenth panel 88 may include a pair of second receptacles 130 and a pair of second slots 132. Each second support block 124 may include two second pins 134, Each second support block 124 may be fixed to the fifteenth panel 88 by engagement of the second pins 134 in respective second receptacles 130 and second slots 132. The second channels 128 may receive edges of three-quarter-length PCIe cards (e.g., three-quarter-length low-profile PCIe card 206 of FIG. 4, three-quarter-length standard-profile PCIe card 260 of FIG. 7).

Figure 6:
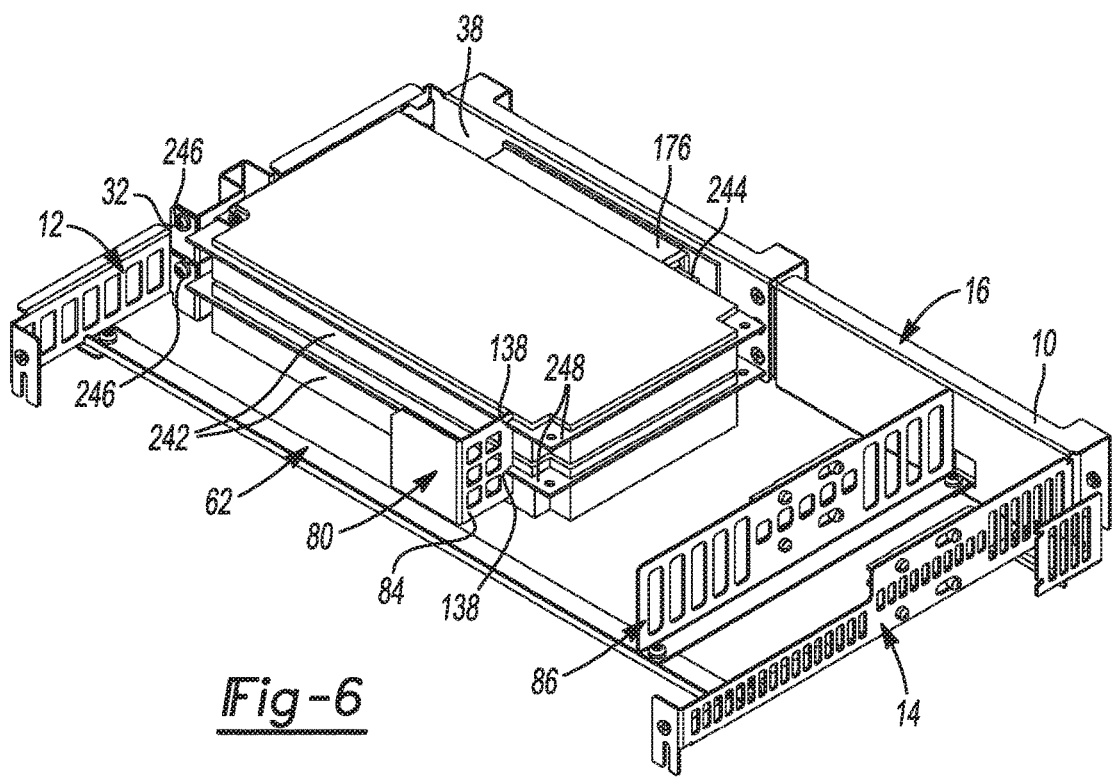
FIG. 6 is a perspective view of the universal bracket of FIG. 1 fixed to two half-length standard-profile PCIe cards.
Figure 7:
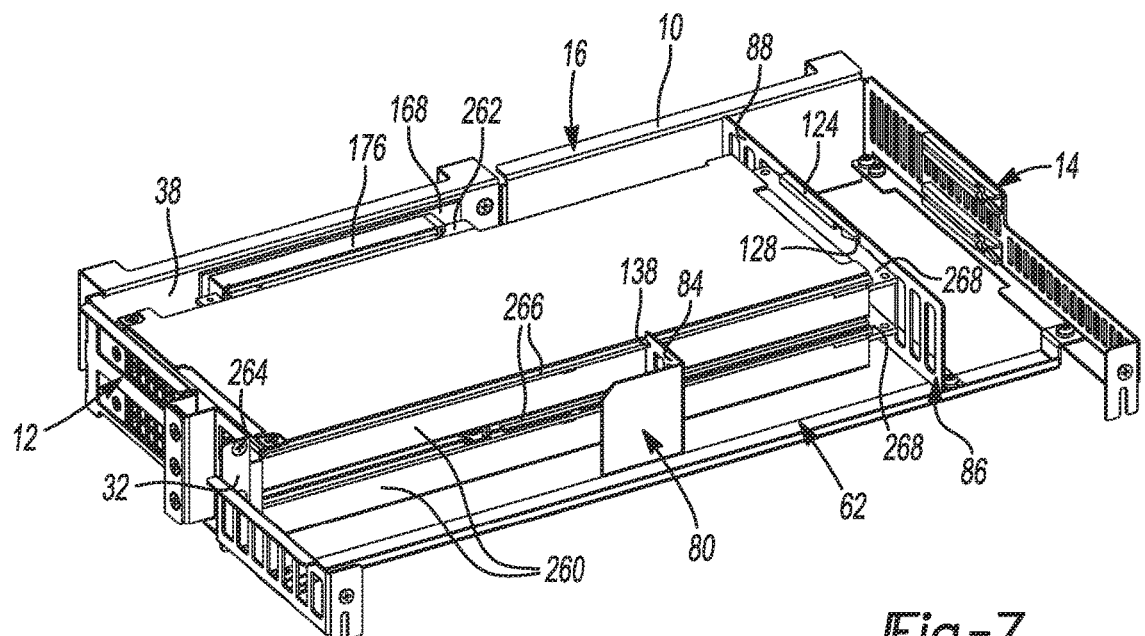
FIG. 7 is a perspective view of the universal bracket of FIG. 1 fixed to two three-quarter-length standard-profile PCIe cards.
Figure 8:
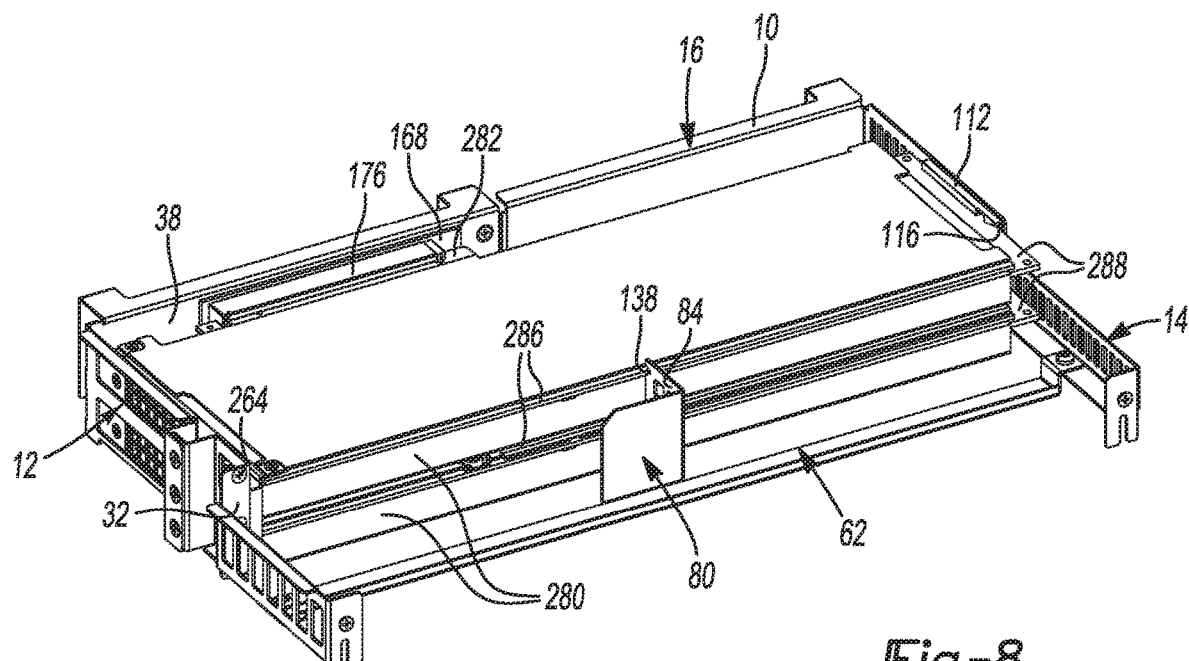
FIG. 8 is a perspective view of the universal bracket of FIG. 1 fixed to two full-length standard-profile PCIe cards.

The internal wall 80 may include features for engaging standard-profile PCIe cards (e.g., half-length standard-profile PCIe card 242 of FIG. 6, three-quarter-length standard-profile PCI card 260 of FIG. 7, and full-length standard-profile PCIe card 280 of FIG. 8). More specifically, the fourteenth panel 84 may include a distal edge 136 for engaging the standard-profile PCIe cards. The distal edge 136 may define two notches 138. A surface of each notch 138 can engage a respective standard-PCIe card.

The universal bracket 10 may also include a plurality of support tabs. For example, the universal bracket 10 may include a first support tab 140, a second support tab 142, a third support tab 144, a fourth support tab, 146, and a fifth support tab 148. The first support tab 140 may extend from the eighth panel 34 toward the second wall 14. The first support tab 140 may be disposed substantially perpendicular to the eighth panel 34 and substantially parallel to the seventh panel 32. The second support tab 142 may extend form the ninth panel 36 toward the first wall 12. The second support tab 142 may be disposed substantially perpendicular to the ninth panel 36 and substantially parallel to the first support tab 140. The third and fourth support tabs 144, 146 may be fixed to the tenth panel 38. Each of the third and fourth support tabs 144, 146 may include a first portion 150 and a second portion 152. The first portion 150 may extend from a top edge 154 of the tenth panel 38. The first portion 150 may extend substantially perpendicular to the tenth panel 38, away from the inner area 18, and substantially parallel to the base 64 of the support 62. The second portion 152 may extend from the first portion 150. The second portion 152 may extend substantially perpendicular to the first portion 150 and substantially parallel to the tenth panel 38. The fifth support tab 148 may be fixed to the twelfth panel 40. The fifth support tab 148 may include a first portion 156 and a second portion 158 (FIG. 2). The first portion 156 may extend substantially perpendicular to the twelfth panel 40, away from the inner area 18, and substantially parallel to the base 64 of the support 62. The second portion 158 may extend substantially perpendicular to the first portion 156 and substantially parallel to the twelfth panel 40.

Each support tab 140, 142, 144, 146, 148 may include a distal or bottom edge 162. The bottom edge 162 may define a guide slot 164. The support tabs 140, 142, 144, 146, 148 may further define respective sixteenth apertures 166. As will be described in greater detail below (FIGS. 9-10), the guide slots 164 and sixteenth apertures 166 can be used to facilitate proper alignment during assembly of the universal bracket 10 to a sled frame (e.g., sled frame 302 of FIG. 9).

With reference to FIG. 2, a riser card 168 is fixed to the universal bracket 10. More particularly, the riser card 168 may be fixed to the tenth panel 38 of the third wall 16. The riser card 168 may include a plurality of apertures 170. The plurality of apertures 170 on the riser card 168 may be aligned with the plurality of thirteenth apertures 106 on the tenth panel 38. A plurality of seventh fasteners 172 extend through the plurality of apertures 170 on the riser card 168 and the plurality of thirteenth apertures 106 in the tenth panel 38 to fix the riser card 168 to the universal bracket 10. The riser card 168 may include a main board connector 174 for connecting the riser card 168 to a motherboard (e.g., motherboard 304 of FIGS. 9, 11). The riser card 168 may further include two PCIe connectors 176 (i.e., a first PCIe connector for connecting a first or top PCIe card and a second PCIe connector for connecting a second or bottom PCIe card). Each PCIe connector 176 may include an adjacent locking mechanism 178 including a lever 180. The locking mechanism 178 can fix the PCIe connectors 176 of the riser card 168 to mating connectors on PCIe cards. The lever 180 can be pressed or rotated to unlock the locking mechanism 178 so that the PCIe cards can be removed from the riser card 168.

Figure 3:
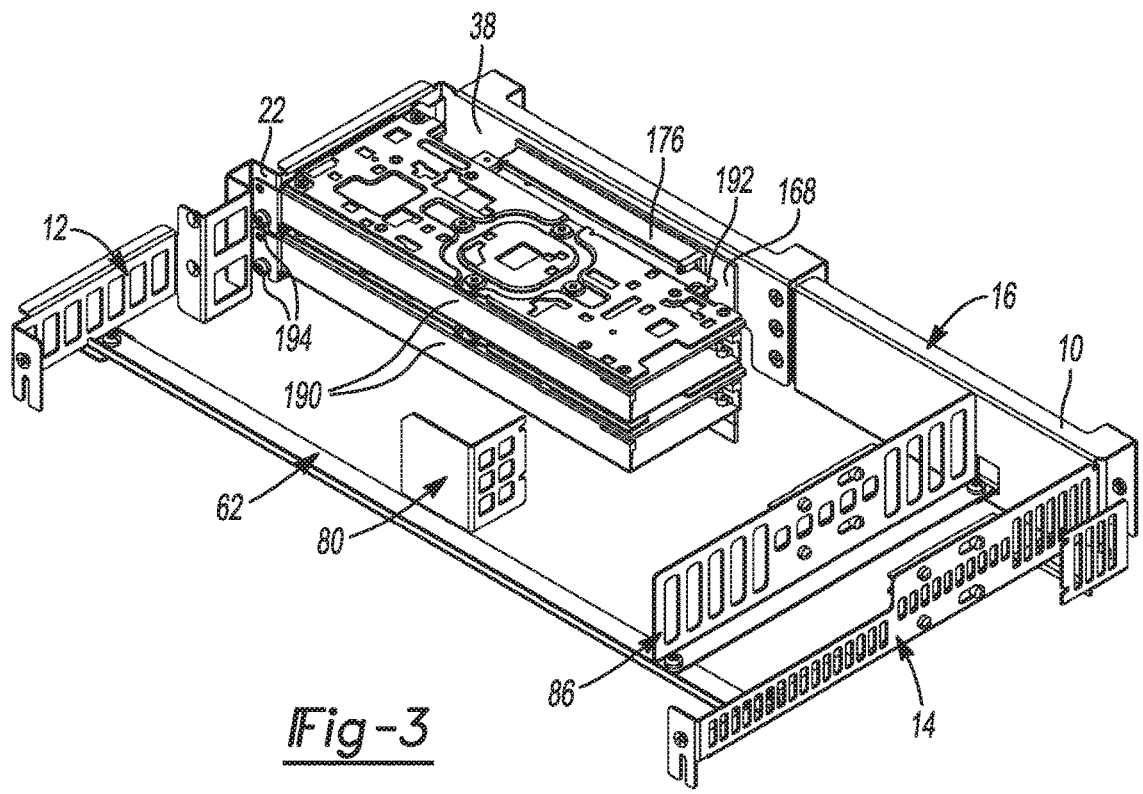
FIG. 3 is a perspective view of the universal bracket of FIG. 1 fixed to two half-length low-profile PCIe cards.

With reference to FIG. 3, two half-length low-profile PCIe cards 190 (i.e., a first or top circuit card and a second or bottom circuit card) may be fixed to the universal bracket 10. Each half-length low-profile PCIe card 190 may include a connector 192 that is physically and electrically connected to the mating PCIe connector 176 of the riser card 168. The half-length low-profile PCIe cards 190 may be fixed to the first wall 12 and the third wall 16. More specifically, the half-length low-profile PCIe cards 190 may be fixed to the second panel 22 of the first wall 12 and the tenth panel 38 of the third wall 16. The half-length low-profile PCIe cards 190 may be fixed to the second panel 22 by a plurality of fasteners 194. The fasteners 194 may extend through respective apertures of the plurality of fourteenth apertures 108 (FIG. 2) on the second panel 22 and into the half-length low-profile PCIe cards 190. The connectors 192 of the half-length low-profile PCIe cards 190 may be engaged in the respective PCIe connectors 176 of the riser card 168 to fix the half-length low-profile PCIe cards 190 to the tenth panel 38.

Referring to FIG. 4, two three-quarter-length low-profile PCIe cards 206 (i.e., a first or top circuit card and a second or bottom circuit card) may be fixed to the universal bracket 10. Each three-quarter-length low-profile PCIe card 206 may include a connector 208 that is physically and electrically connected to the mating PCIe connector 176 of the riser card 168. The three-quarter-length low-profile PCIe cards 206 may be fixed to the first wall 12, the third wall 16, and the fourth wall 86. More specifically, the three-quarter-length low-profile PCIe cards 206 may be fixed to the second panel 22 of the first wall 12, the tenth panel 38 of the third wall 16, and the fifteenth panel 88 of the fourth wall 86. The three-quarter-length low-profile PCIe cards 206 may be fixed to the second panel 22 by a plurality of fasteners (not shown, similar to the fasteners 194 of FIG. 3). The fasteners may extend through respective apertures of the plurality of fourteenth apertures 108 (FIG. 2) on the second panel 22 and into the three-quarter-length low-profile PCIe cards 206. The connectors 208 of the three-quarter-length low-profile PCIe cards 206 may be engaged in the respective PCIe connectors 176 of the riser card 168 to fix the three-quarter-length low-profile PCIe cards 206 to the tenth panel 38. Each three-quarter-length low-profile PCIe card 206 may include an edge 212. Each edge 212 may engage a respective second channel 128 of a second support block 124 on the fifteenth panel 88 of the fourth wall 86. The three-quarter-length low-profile PCIe cards 206 are fixed to the universal bracket 10 at three locations to reduce vibration.

Figure 5:
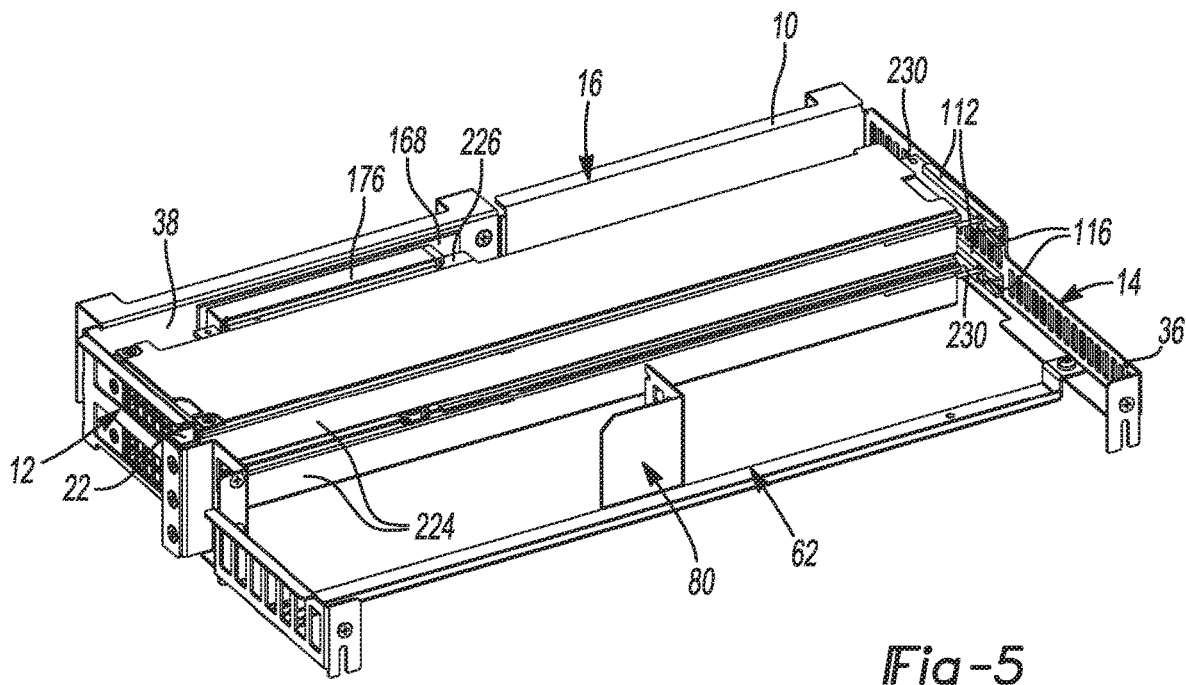
FIG. 5 is a perspective view of the universal bracket of FIG. 1 fixed to two full-length low-profile PCIe cards.

With reference to FIG. 5, two full-length low-profile PCIe cards 224 (i.e., a first or top circuit card and a second or bottom circuit card) may be fixed to the universal bracket 10. Each full-length low-profile PCIe card 224 may include a connector 226 that is physically and electrically connected to the mating PCIe connector 176 of the riser card 168. The full-length low-profile PCIe cards 224 may be fixed to the first wall 12, the third wall 16, and the second wall 14. More specifically, the full-length low-profile PCIe cards 224 may be fixed to the second panel 22 of the first wall 12, the tenth panel 38 of the third wall 16, and the ninth panel 36 of the second wall 14. The full-length low-profile PCIe cards 224 may be fixed to the second panel 22 by a plurality of fasteners (similar to the fasteners 194 of FIG. 3). The fasteners may extend through respective apertures of the plurality of fourteenth apertures 108 (FIG. 2) on the second panel 22 and into the full-length low-profile PCIe cards 224. The connectors 226 of the full-length low-profile PCIe cards 224 may be engaged in the respective PCIe connectors 176 of the riser card 168 to fix the full-length low-profile PCIe cards 224 to the tenth panel 38. Each full-length low-profile PCIe card 224 may include an edge 230. Each edge 230 may engage a respective first channel 116 of a first support block 112 on the ninth panel 36 of the second wall 14. The full-length low-profile PCIe cards 224 are fixed to the universal bracket 10 at three locations to prevent or reduce vibration.

Referring to FIG. 6, two half-length standard-profile PCIe cards 242 (i.e., a first or top circuit card and a second or bottom circuit card) may be fixed to the universal bracket 10. Each half-length standard-profile PCIe card 242 may include a connector 244 that is physically and electrically connected to the mating PCIe connector 176 of the riser card 168. The half-length standard-profile PCIe cards 242 may be fixed to the first wall 12, the third wall 16, and the internal wall 80.

More specifically, the half-length standard-profile PCIe cards 242 may be fixed to the seventh panel 32 of the first wall 12, the tenth panel 38 of the third wall 16, and the fourteenth panel 84 of the internal wall 80. The half-length standard-profile PCIe cards 242 may be fixed to the seventh panel 32 by a plurality of fasteners 246. The fasteners 246 may extend through respective fifteenth apertures 110 (FIG. 2) on the seventh panel 32 and into the half-length standard-profile PCIe cards 242. The connectors 244 of the half-length standard-profile PCIe cards 242 may be engaged in the respective PCIe connectors 176 of the riser card 168 to fix the half-length low-profile PCIe cards 242 to the tenth panel 38. Each half-length standard-profile PCIe card 242 may include an edge 248. Each edge 248 may engage a surface of a respective notch 138 of the fourteenth panel 84 of the internal wall 80. The half-length standard-profile PCIe cards 242 are fixed to the universal bracket 10 at three locations to prevent or reduce vibration.

With reference to FIG. 7, two three-quarter-length standard-profile PCIe cards 260 (i.e., a first or top circuit card and a second or bottom circuit card) may be fixed to the universal bracket 10. Each three-quarter-length standard-profile PCIe card 260 may include a mating connector 262 that is physically and electrically connected to the PCIe connector 176 of the riser card 168. The three-quarter-length standard-profile PCIe cards 260 may be fixed to the first wall 12, the third wall 16, the internal wall 80, and the fourth wall 86. More specifically, the three-quarter-length standard-profile PCIe cards 260 may be fixed to the seventh panel 32 of the first wall 12, the tenth panel 38 of the third wall 16, the fourteenth panel 84 of the internal wall 80, and the fifteenth panel 88 of the fourth wall 86. The three-quarter-length standard-profile PCIe cards 260 may be fixed to the seventh panel 32 by a plurality of fasteners 264. The fasteners 264 may extend through respective fifteenth apertures 110 (FIG. 2) on the seventh panel 32 and into the three-quarter-length standard-profile PCIe card 260. The connectors 262 of the three-quarter-length standard-profile PCIe cards 260 may be engaged in the respective PCIe connectors 176 of the riser card 168 to fix the three-quarter-length standard-profile PCIe cards 260 to the tenth panel 38. Each three-quarter-length standard-profile PCIe card 260 may include a first edge 266 and a second edge 268. Each first edge 266 may engage a surface of a respective notch 138 of the fourteenth panel 84 of the internal wall 80. Each second edge 268 may engage a respective second channel 128 of a second support block 124 on the fifteenth panel 88 of the fourth wall 86. The three-quarter-length standard-profile PCIe cards 260 are fixed to the universal bracket 10 at four locations to prevent or reduce vibration.

Referring to FIG. 8, two full-length standard-profile PCIe cards 280 (i.e., a first or top circuit card and a second or bottom circuit card) may be fixed to the universal bracket 10. Each full-length standard-profile PCIe card 280 may include a mating connector 282 that is physically and electrically connected to the PCIe connector 176 of the riser card 168. The full-length standard-profile PCIe cards 280 may be fixed to the first wall 12, the third wall 16, the internal wall 80, and the second wall 14. More specifically, the full-length standard-profile PCIe cards 280 may be fixed to the seventh panel 32 of the first wall 12, the tenth panel 38 of the third wall 16, the fourteenth panel 84 of the internal wall 80, and the ninth panel 36 of the second wall 14. The full-length standard-profile PCIe cards 280 may be fixed to the seventh panel 32 by a plurality of fasteners 284. The fasteners 284 may extend through respective fifteenth apertures 110 (FIG. 2) on the seventh panel 32 and into the full-length standard-profile PCIe cards 280. The connectors 282 of full-length standard-profile PCIe cards 280 may be engaged in the respective PCIe connectors 176 of the riser card 168 to fix the full-length standard-profile PCIe cards 280 to the tenth panel 38. Each full-length standard-profile PCIe card 280 may include a first edge 286 and a second edge 288. Each first edge 286 may engage a surface of a respective notch 138 of the fourteenth panel 84 of the internal wall 80. Each second edge 288 may engage a respective first channel 116 of a first support block 112 on the ninth panel 36 of the second wall 14. The full-length standard-profile PCIe cards 280 are fixed to the universal bracket 10 at four locations to prevent or reduce vibration.

In various aspects, the universal bracket 10 may be adapted to receive at least two different standardized types of circuit cards, optionally at least three different standardized types of circuit cards, optionally at least four different standardized types of circuit cards, optionally at least five different standardized types of circuit cards, and optionally at least six different standardized types of circuit cards. The standardized types of circuit cards may include: a half-length low-profile PCIe card, a three-quarter-length low-profile PCIe card, a full-length low-profile PCIe card, a half-length standard-profile PCIe card, a three-quarter-length standard-profile PCIe card, and a full-length standard-profile PCIe card. Thus, the at least two different standardized types of circuit cards can include six circuit cards. A first or top circuit card and a second or bottom circuit card may be independently selected from the group including the half-length low-profile PCIe card, the three-quarter-length low-profile PCIe card, the full-length low-profile PCIe card, the half-length standard-profile PCIe card, the three-quarter-length standard-profile PCIe card, and the full-length standard-profile PCIe card.

Figure 9:
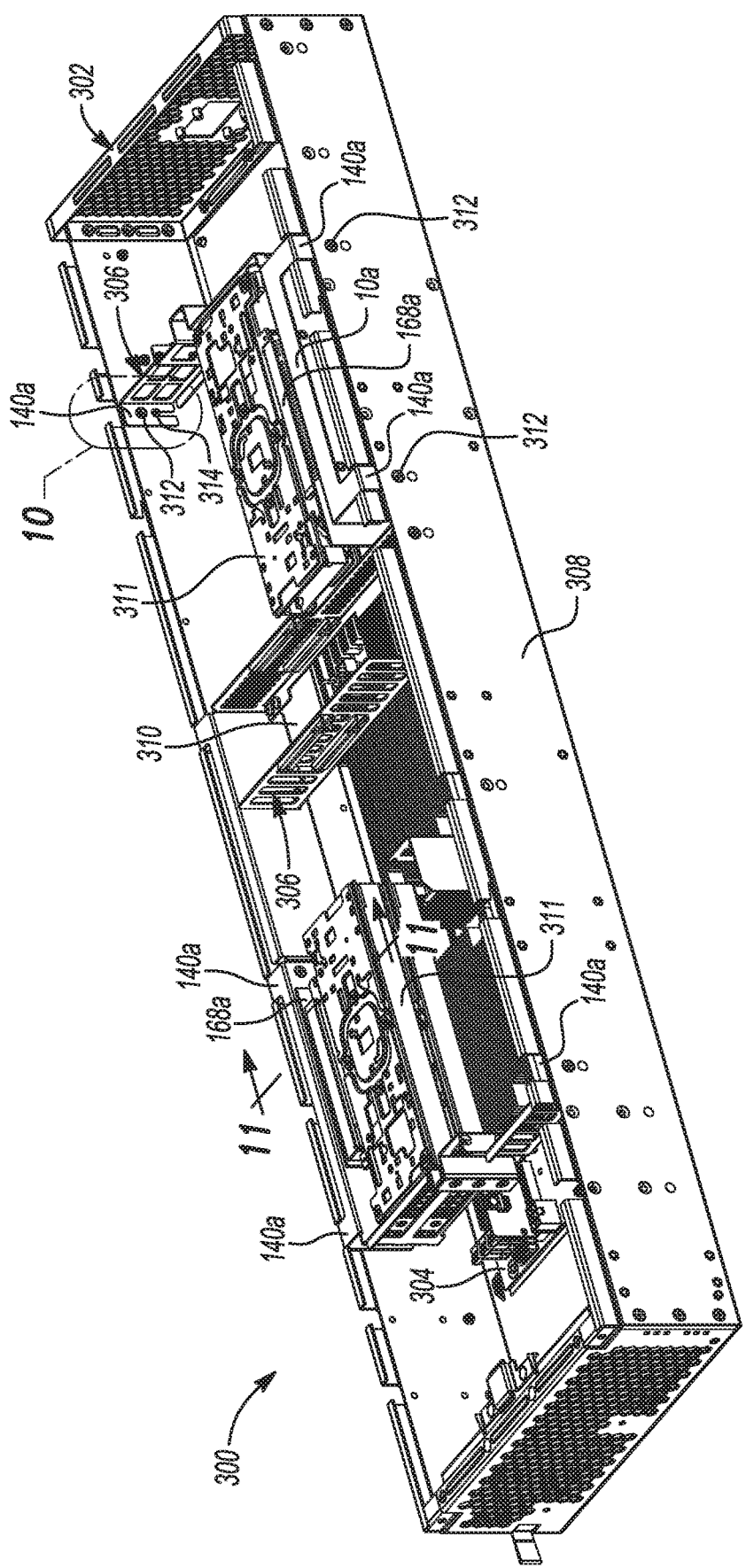
FIG. 9 is a sled assembly including a sled frame, a motherboard, and two universal bracket assemblies in accordance with the present disclosure.

With reference to FIG. 9, a sled assembly 300 according to certain aspects of the present disclosure is provided. The sled assembly 300 includes a sled frame 302, a motherboard 304, and two universal bracket assemblies 306. The sled frame 302 includes a peripheral wall 308 at least partially defining an internal compartment 310. The motherboard 304 is disposed within the internal compartment 310 of the sled frame 302.

Each universal bracket assembly 306 includes a universal bracket 10a similar to the universal bracket 10 of FIGS. 1-9, a riser card 168a similar to the riser card 168 of FIGS. 2-9, and two low-profile PCIe cards 311. The universal bracket 10a may include a plurality of support tabs 140a similar to the support tabs 140, 142, 144, 146, 148 of FIG. 1. Each support tab 140a may include a guide slot 164a and aperture 166a similar to the guide slot 164 and aperture 166 of FIG. 1, respectively.

Figure 10:
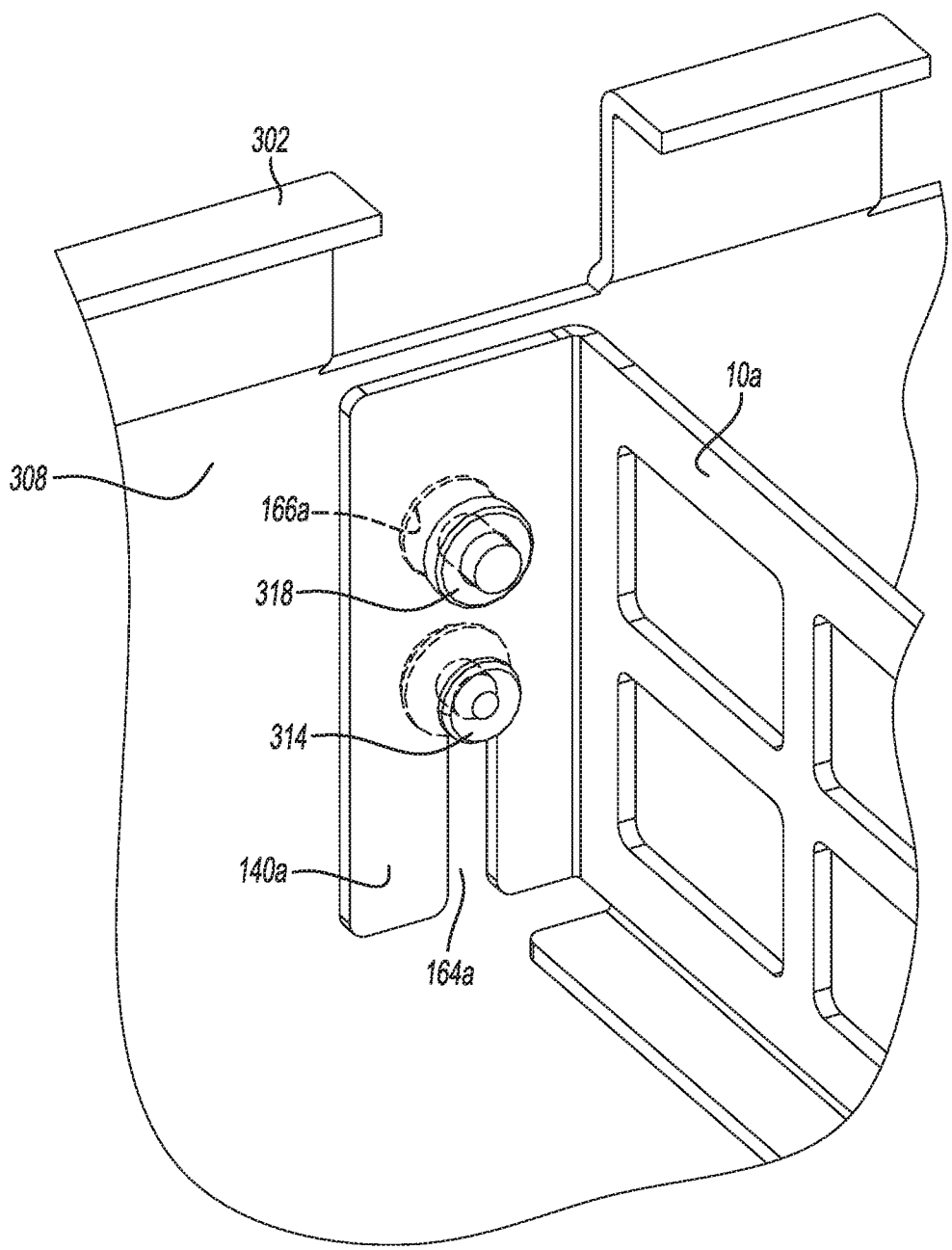
FIG. 10 is a partial perspective view of the sled assembly of FIG. 9.
Figure 11:
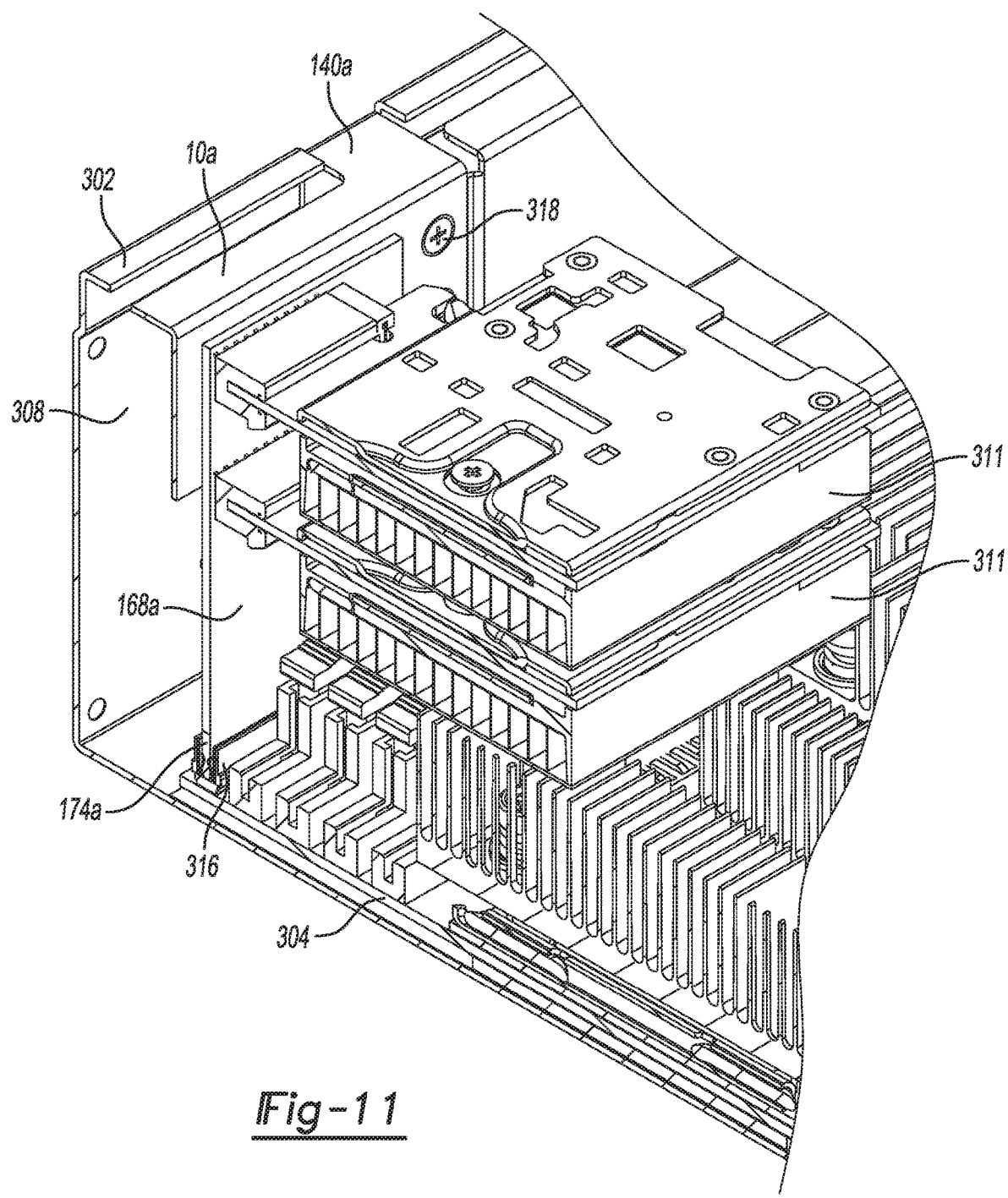
FIG. 11 is another partial perspective view of the sled assembly of FIG. 9.

The sled frame 302 includes a plurality of apertures 312 and a plurality of guide pins 314. As best shown in FIG. 10, the guide pins 314 of the sled frame 302 are slidably disposed in the guide slots 164a of the universal brackets 10a to ensure proper alignment of the universal brackets 10a within the internal compartment 310 of the sled frame 302. More specifically, engagement of the guide pins 314 with surfaces of the guide slots 164a facilitates the proper position of the riser card 168a with respect to the motherboard 304. Referring to FIG. 11, each of the two riser card 168a includes a main board connector 174a, similar to the main board connector 174 of FIG. 2. Each main board connector 174a may be physically and electrically connected to a riser card connector 316 of the motherboard 304. Engagement of the guide pins 314 of the sled frame 302 with the surface of the guide slots 164a of the universal brackets 10a prevents over-insertion of the main board connector 174 in the riser card connector 316. A plurality of fasteners 318 may extend through the apertures 312 in the sled frame 302 and the apertures 166a in the support taps 140a to fix the universal bracket 10a to the sled frame 302.

In various aspects, the present disclosure also provides a method of assembling a sled assembly. The method will be discussed in the context of the components of the sled assembly 300 of FIGS. 9-11, however, one skilled in the art would appreciate that the method is similarly applicable to other sled assemblies and components. In certain aspects, the sled assembly may be used in a 2U-based chassis.

The method may include fixing the riser card 168a to the universal bracket 10a. Fixing the riser card 168a to the universal bracket 10a may include aligning a plurality of apertures in the riser card (e.g., the apertures 170 of the riser card 168 of FIG. 2) with a respective plurality of apertures in the universal bracket 10a (e.g., the plurality of third apertures 58 in the tenth panel 38 of the third wall 16 of the universal bracket 10 of FIG. 2). Fixing the riser card 168a to the universal bracket 10a may further include extending a plurality of fasteners (e.g., the plurality of seventh fasteners 172 of FIG. 2) through the apertures in the riser card 168a and the universal bracket 10a.

The method may also include physically and electrically connecting a connector of a first or top circuit card (e.g., the connector 192 of the half-length low-profile PCIe card 190 of FIG. 3, the connector 208 of the three-quarter-length low-profile PCIe card 206 of FIG. 4, the connector 226 of the full-length low-profile PCIe card 224 of FIG. 5, the connector 244 of the half-length standard-profile PCIe card 242 of FIG. 6, the connector 262 of the three-quarter-length standard-profile PCIe card 260 of FIG. 7, the connector 282 of the full-length standard-profile PCIe card 280 of FIG. 8) to a first mating PCIe connector (e.g., the PCIe connector 176 of the riser card 168 of FIG. 2) of the riser card 168a.

The method may also include physically and electrically connecting a connector of a second or bottom circuit card (e.g., the connector 192 of the half-length low-profile PCIe card 190 of FIG. 3, the connector 208 of the three-quarter-length low-profile PCIe card 206 of FIG. 4, the connector 226 of the full-length low-profile PCIe card 224 of FIG. 5, the connector 244 of the half-length standard-profile PCIe card 242 of FIG. 6, the connector 262 of the three-quarter-length standard-profile PCIe card 260 of FIG. 7, the connector 282 of the full-length standard-profile PCIe card 280 of FIG. 8) to a second mating PCIe connector (e.g., the PCIe connector 176 of the riser card 168 of FIG. 2) of the riser card 168a.

The first and second circuit cards may be independently selected from the group including a half-length low-profile PCIe card, a three-quarter-length low-profile PCIe card, a full-length low-profile PCIe card, a half-length standard-profile PCIe card, a three-quarter-length standard-profile PCIe card, and a full-length standard-profile PCIe card. The first and second circuit cards may be connected to the riser card 168a after the riser card 168a is fixed to the universal bracket 10a. The first and second circuit cards may be connected to the riser card in either order.

The method may further include fixing the first and second circuit cards to a first wall (e.g., the first wall 12 of the universal bracket 10 of FIG. 1) of the universal bracket 10a (e.g., fixing the half-length low-profile PCIe card 190 to the second panel 22 of the first wall 12 in FIG. 3, fixing the half-length standard-profile PCIe card 242 to the seventh panel 32 of the first wall 12 in FIG. 6). The first and second circuit cards may be fixed to the first wall of the universal bracket 10a after the first and second circuit cards are connected to the riser card 168a. The method may include additional steps depending on the type of circuit card. For example, the circuit card may be fixed to the universal bracket 10a in additional locations, such as a second wall of the universal bracket 10a (e.g., for full-length PCIe cards 224, 280 of FIGS. 5, 8, respectively), a fourth wall of the universal bracket 10a (e.g., for three-quarter-length PCIe cards 206, 260 of FIGS. 4, 7, respectively), and/or an internal wall of the universal bracket (e.g., for standard-profile PCIe cards 242, 260, 280 of FIGS. 6-8, respectively).

The method may also include disposing the universal bracket 10a including the first and second circuit cards and the riser card in the sled frame 302. The guide slots 164a in the universal bracket 10a may be aligned with the guide pins 314 in the sled frame 302. The universal bracket 10a may be lowered into the sled frame 302 until the guide pins 314 are fully disposed within the guide slots 164a. The main board connector 174a of the riser card 168a may be concurrently physically and electrically connected to the riser card connector 316 of the motherboard 304. The method may further include fixing the universal bracket 10a to the sled frame 302 by extending the fasteners 318 through the apertures 312 in the sled frame 302 and the apertures 166a in the universal bracket 10a.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A universal bracket comprising:
   a first wall configured to be fixed to a first circuit card and a second circuit card, wherein the first circuit card and the second circuit card include any of at least two different standardized types of circuit cards;
   a second wall opposite the first wall;
   a third wall extending between the first wall and the second wall and being configured to be fixed to a riser card having a first connector for receiving a first mating connector of the first circuit card and a second connector for receiving a second mating connector of the second circuit card; and
   a plurality of support tabs projecting from one or more of the first wall, the second wall, and the third wall, each support tab of the plurality of support tabs defining a guide slot configured to engage a respective guide pin of a plurality of guide pins on a sled frame.

2. The universal bracket of claim 1, wherein the at least two different standardized types of circuit cards includes six standardized circuit cards, and the first and second circuit cards are selected from a group including a half-length low-profile PCIe card, a three-quarter-length low-profile PCIe card, a full-length low-profile PCIe card, a half-length standard-profile PCIe card, a three-quarter-length standard-profile PCIe card, or a full-length standard-profile PCIe card.

3. The universal bracket of claim 1, wherein at least one of the first circuit card and the second circuit card includes a full-length PCIe card and the full-length PCIe card engages the second wall.

4. The universal bracket of claim 3, wherein the second wall includes a channel and an edge of the full-length PCIe card is disposed in the channel.

5. The universal bracket of claim 1, further comprising a support including a panel that extends between the first wall and the second wall.

6. The universal bracket of claim 5, further comprising an internal wall extending from the support toward the third wall, the internal wall being disposed between the first wall and the second wall, wherein:
   a distal edge of a panel of the internal wall includes a notch;
   at least one of the first circuit card and the second circuit card includes a standard-profile PCIe card; and
   the standard-profile PCIe card engages a surface of the notch.

7. The universal bracket of claim 5, further comprising a fourth wall extending between the third wall and the support, the fourth wall being disposed between the first wall and the second wall.

8. The universal bracket of claim 7, wherein:
   at least one of the first circuit card and the second circuit card includes a three-quarter-length PCIe card; and
   the fourth wall includes a channel and an edge of the three-quarter-length PCIe card is disposed in the channel.

9. The universal bracket of claim 7, wherein:
   the fourth wall is removably fixed to the third wall and the support; and
   the fourth wall is configured to be removed from the third wall and the support when at least one of the first circuit card and the second circuit card includes a full-length PCIe card.

10. The universal bracket of claim 5, further comprising:
    an internal wall extending from the support toward the third wall, the internal wall being disposed between the first wall and the second wall; and
    a fourth wall extending between the third wall and the support, the fourth wall being disposed between the internal wall and the second wall, and the fourth wall being removably fixed to the third wall and the support, wherein:
    the at least two different standardized types of circuit cards include: a half-length low-profile PCIe card, a three-quarter-length low-profile PCIe card, a full-length low-profile PCIe card, a half-length standard-profile PCIe card, a three-quarter-length standard-profile PCIe card, or a full-length standard-profile PCIe card;
    the fourth wall is configured to be removed from the third wall and the support when at least one of the first circuit card and the second circuit card includes the full-length low-profile PCIe card or the full-length standard-profile PCIe card;
    the second wall is configured to engage the full-length low-profile PCIe card and the full-length standard-profile PCIe card;
    the internal wall is configured to engage the half-length standard-profile PCIe card, the three-quarter-length standard-profile PCIe card, and the full-length standard-profile PCIe card; and
    the fourth wall is configured to engage the three-quarter-length low-profile PCIe card and the three-quarter-length standard-profile PCIe card.

11. A universal bracket comprising:
    a first wall configured to be fixed to a first circuit card and a second circuit card, wherein the first circuit card and the second circuit card include any of at least two different standardized types of circuit cards;

a second wall opposite the first wall;
a third wall extending between the first wall and the second wall and being configured to be fixed to a riser card having a first connector for receiving a first mating connector of the first circuit card and a second connector for receiving a second mating connector of the second circuit card;
a support including a panel that extends between the first wall and the second wall; and
a fourth wall extending between the third wall and the support, the fourth wall being disposed between the first wall and the second wall.

12. The universal bracket of claim 11, further comprising an internal wall extending from the support toward the third wall, the internal wall being disposed between the first wall and the second wall, wherein:
a distal edge of a panel of the internal wall includes a notch;
at least one of the first circuit card and the second circuit card includes a standard-profile PCIe card; and
the standard-profile PCIe card engages a surface of the notch.

13. The universal bracket of claim 11, wherein:
at least one of the first circuit card and the second circuit card includes a three-quarter-length PCIe card; and
the fourth wall includes a channel and an edge of the three-quarter-length PCIe card is disposed in the channel.

14. The universal bracket of claim 11, wherein at least one of the first circuit card and the second circuit card includes a full-length PCIe card and the full-length PCIe card engages the second wall.

15. The universal bracket of claim 14, wherein the second wall includes a channel and an edge of the full-length PCIe card is disposed in the channel.

16. The universal bracket of claim 11, wherein:
the fourth wall is removably fixed to the third wall and the support; and
the fourth wall is configured to be removed from the third wall and the support when at least one of the first circuit card and the second circuit card includes a full-length PCIe card.

17. The universal bracket of claim 11, further comprising a plurality of support tabs projecting from one or more of the first wall, the second wall, and the third wall, each support tab of the plurality of support tabs defining a guide slot configured to engage a respective guide pin of a plurality of guide pins on a sled frame.

18. A universal bracket comprising:
a first wall configured to be fixed to a first circuit card and a second circuit card, wherein the first circuit card and the second circuit card include any of at least two different standardized types of circuit cards;
a second wall opposite the first wall;
a third wall extending between the first wall and the second wall and being configured to be fixed to a riser card having a first connector for receiving a first mating connector of the first circuit card and a second connector for receiving a second mating connector of the second circuit card;
a support including a panel that extends between the first wall and the second wall; and
an internal wall extending from the support toward the third wall, the internal wall being disposed between the first wall and the second wall, wherein:
a distal edge of a panel of the internal wall includes a notch;
at least one of the first circuit card and the second circuit card includes a standard-profile PCIe card; and
the standard-profile PCIe card engages a surface of the notch.

19. The universal bracket of claim 18, further comprising:
a fourth wall extending between the third wall and the support, the fourth wall being disposed between the internal wall and the second wall, and the fourth wall being removably fixed to the third wall and the support, wherein:
the at least two different standardized types of circuit cards include: a half-length low-profile PCIe card, a three-quarter-length low-profile PCIe card, a full-length low-profile PCIe card, a half-length standard-profile PCIe card, a three-quarter-length standard-profile PCIe card, or a full-length standard-profile PCIe card;
the fourth wall is configured to be removed from the third wall and the support when at least one of the first circuit card and the second circuit card includes the full-length low-profile PCIe card or the full-length standard-profile PCIe card;
the second wall is configured to engage the full-length low-profile PCIe card and the full-length standard-profile PCIe card;
the internal wall is configured to engage the half-length standard-profile PCIe card, the three-quarter-length standard-profile PCIe card, and the full-length standard-profile PCIe card; and
the fourth wall is configured to engage the three-quarter-length low-profile PCIe card and the three-quarter-length standard-profile PCIe card.

20. The universal bracket of claim 18, further comprising a plurality of support tabs projecting from one or more of the first wall, the second wall, and the third wall, each support tab of the plurality of support tabs defining a guide slot configured to engage a respective guide pin of a plurality of guide pins on a sled frame.

* * * * *